United States Patent [19]
Müller et al.

[11] Patent Number: 5,453,186
[45] Date of Patent: Sep. 26, 1995

[54] SEPARATING MATERIALS

[75] Inventors: Werner Müller, Heppenheim; Joachim Kinkel, Guldental, both of Germany

[73] Assignee: Merck Patent Gesellschaft mit beschrankter Haftung, Darmstadt, Germany

[21] Appl. No.: 376,656

[22] Filed: Jan. 20, 1995

Related U.S. Application Data

[63] Continuation of Ser. No. 149,420, Nov. 9, 1993, abandoned, which is a continuation of Ser. No. 330,582, Mar. 30, 1989, abandoned.

[30] Foreign Application Priority Data

Mar. 31, 1988 [DE] Germany .......................... 38 11 042.3

[51] Int. Cl.⁶ .................................................... B01D 15/08
[52] U.S. Cl. ................................... 210/198.2; 210/502.1; 210/635; 210/656; 502/402
[58] Field of Search .............................. 210/198.2, 502.1, 210/635, 656; 502/401, 402, 404

[56] References Cited

U.S. PATENT DOCUMENTS

| | | | |
|---|---|---|---|
| 3,663,263 | 5/1972 | Bodre | 210/198.2 |
| 4,029,583 | 6/1977 | Chang | 210/198.2 |
| 4,045,353 | 8/1977 | Kosaka | 55/386 |
| 4,140,653 | 2/1979 | Imura | 210/198.2 |
| 4,202,775 | 5/1980 | Abe | 210/287 |
| 4,246,351 | 1/1981 | Miyake | 210/692 |
| 4,324,689 | 4/1982 | Shah | 210/198.2 |
| 4,330,440 | 5/1982 | Ayers | 210/198.2 |
| 4,332,694 | 6/1982 | Kalal | 424/386 |
| 4,335,226 | 6/1982 | Muller | 210/656 |
| 4,406,870 | 9/1983 | Miyake | 210/681 |
| 4,415,631 | 11/1983 | Schutijser | 210/198.2 |
| 4,551,245 | 11/1985 | Ramsden | 10/198.2 |
| 4,710,525 | 12/1987 | Kraemer | 523/201 |
| 4,737,533 | 4/1988 | Charmot | 264/311.11 |
| 4,756,834 | 7/1988 | Müller | 210/635 |
| 4,767,529 | 8/1988 | Boos | 210/198.2 |
| 4,829,101 | 5/1989 | Kraemer | 523/201 |
| 4,882,048 | 11/1989 | Blaschke | 210/198.2 |
| 4,882,226 | 11/1989 | Schutyser | 210/198.2 |

FOREIGN PATENT DOCUMENTS

| | | | |
|---|---|---|---|
| 0154246 | 2/1985 | European Pat. Off. | 210/198.2 |
| 172579 | 2/1986 | European Pat. Off. | 210/198.2 |
| 249078 | 12/1987 | European Pat. Off. | 210/198.2 |
| 2750595 | 7/1978 | Germany | 210/198.2 |
| 3619303 | 12/1987 | Germany | 210/198.2 |

OTHER PUBLICATIONS

Albertson, (1971) 2nd Ed., Almquist & Wiksell, Stockholm "Partition of Cell Particles and Macromolecules", pp. 7–10 and 201–202.
Tezuka et al. in Macromol. Chem. 186, 685–694 (1985).
"Synthesis of poly(vinyl alcohol)/poly(dimethylsiloxane) graft copolymer".
E. Mino et al., J. of Polymer Science, vol. XXXI, No. 12 (1958), 242–243.
Werner Müller et al., J. of Chromatography, 510 (1990) 133, 136, 137, & 140.
J. Cacia et al., J. of Chromatography, 634 (1993) 229, 231, 233, 235, 237 & 239.

*Primary Examiner*—Ernest G. Therkorn
*Attorney, Agent, or Firm*—Millen, White, Zelano & Branigan

[57] ABSTRACT

The invention is directed to separating materials comprising a primary or secondary aliphatic hydroxyl group-containing support coated with at least one covalently bonded polymer, wherein (1) the covalently bonded polymers are bonded to the support by graft polymerization via the α-carbon atoms of the hydroxyl groups, and
(2) the polymer contains identical or different recurring units of the formula I

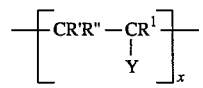

wherein
$R^1$ is H or $CH_3$;
Y is

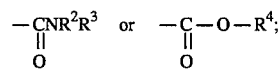

R' and R" are each independently H or $CH_3$,
$R^2$ and $R^3$ are each independently
 (a) $C_{1-10}$-alkyl, phenyl, phenyl-$C_{1-10}$-alkyl, cycloalkyl, $C_{1-10}$-alkyl-cycloalkyl or $C_{1-10}$-alkylphenyl,
 (b) one of the above groups in (a) monosubstituted or polysubstituted by each of amino, mono- or dialkylamino, trialkylammonium, carboxyl, or sulfonyl,
 (c) a cyclic or bicyclic radical having 5–10 C atoms, wherein one or more CH or $CH_2$ groups is replaced by (i) N or NH, (ii) N or NH and S, or (iii) N or NH and O, or
 (d) one of $R^2$ or $R^3$ is H;
and wherein $R^2$ and $R^3$ are coordinated with one another so that either both radicals are acidic or basic, or one of the radicals is neutral and one is acidic or basic,
x is 2 to 100,
and $R^4$ is $C_{1-10}$-alkyl, phenyl, phenyl-$C_{1-10}$-alkyl, cycloalkyl or $C_{1-10}$-alkyl-cycloalkyl, or $C_{1-10}$-cyclophenyl, each monosubstituted or polysubstituted by carboxyl or sulfonyl.

7 Claims, No Drawings

SEPARATING MATERIALS

This application is a continuation of application Ser. No. 08/149,420, filed Nov. 9, 1993, which, in turn, is a continuation of application Ser. No. 07/330,582, filed Mar. 30, 1989, both now abandoned.

SUMMARY OF THE INVENTION

The invention relates to separating materials based on supports containing hydroxyl groups, the surfaces of which are coated with covalently bonded polymers, the polymers containing identical or different recurring units of the formula I

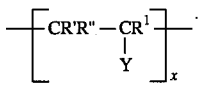

wherein
$R^1$ is H or $CH_3$
Y is

—CN, —CHO, —OH, —$CH_2$—$NH_2$ or —$CH_2NR^2R^3$,
R' and R" are in each case H or $CH_3$, and if Y=—OH one of the radicals R' and R" may also be —OH,
X is —OH, —$NR^2R^3$ or —$OR^4$,
$R^2$ and $R^3$ in each case
  are an alkyl, phenyl, cycloalkyl or alkyl-cycloalkyl, or phenyl-alkyl or alkylphenyl group having up to 10 C atoms in the alkyl group, it being possible for these groups to be monosubstituted or polysubstituted by alkoxy, cyano, amino, mono- or dialkylamino, trialkylammonium, carboxyl, sulfonyl, acetoxy or acetamino radicals,
  are a cyclic or bicyclic radical having 5–10 C atoms, wherein one or more CH or $CH_2$ groups are replaced by N or NH, N or NH and S, or N or NH and O,
  or are a sulfone sulfide of the structure —$(CH_2)_n$—$SO_2$—$(CH_2)_nS(CH_2)_n$OH With n=2–6 and one of the radicals $R^2$ and $R^3$ may also be H,
  where $R^2$ and $R^3$ are co-ordinated with one another so that either both radicals are acidic or basic, or one or both of the radicals are neutral,
x is 2 to 100,
and $R_4$ is an alkyl, phenyl, cycloalkyl, alkyl-cycloalkyl, phenylalkyl or alkylphenyl group having up to 10 C atoms in the alkyl group, it being possible for these groups to be monosubstituted or polysubstituted by alkoxy, cyano, carboxyl, sulfonyl or acetoxy radicals,
and a process for their preparation.

The separating materials according to the invention may be employed for the separation of macromolecules, in particular for the fractionation of biopolymers.

The separation and purification of biological macromolecules, such as, for example, nucleic acids, proteins, enzymes, subcellular units, peptides, monoclonal antibodies or whole cells, have acquired great importance With regard to genetic engineering and biotechnology.

Some separation methods for biopolymers are described in the literature.

It is known, for example, that nucleic acid mixtures and protein mixtures can be separated in an aqueous polyethylene glycol-dextran two-phase system by the countercurrent partition method (P. A. Albertson (1971), 2nd Ed., Almquist & Wiksell, Stockholm). As a further development, phase supports for the partition chromatography of biopolymers in a two-phase system are described in EP-0,154,246. These phase supports are composed of non-adsorptive base support particles which are insoluble in the phase system, the surface of which is coated with a strongly adhering material (for example chemically bonded polyacrylamide) having affinity for one of the phases of the phase system.

The use of ion exchangers for the fractionation of biological macromolecules is also known. The conventional materials are composed of polymers such as, for example, polymethacrylates, polystyrenes, agarose, crosslinked dextran or silica gels which carry appropriate functional groups. However, the dissolving ability and the binding capacity of such materials are frequently very unsatisfactory. In addition, the biomolecules to be separated are often denatured or no longer completely eluted.

The object of the present invention is to develop separating materials which are universally employable in chromatography for the fractionation of biopolymers and are free of the disadvantages mentioned, i.e. which are able to bind the molecules to be separated completely reversibly without denaturation and with high capacity.

Surprisingly it has been found that the separating materials according to the invention fulfill the abovementioned requirements and are suitable for the fractionation of macromolecules, in particular biopolymers. In this connection, these separating materials are universally suitable for affinity chromatography, reversed phase or hydrophobic chromatography or very particularly for ion-exchange chromatography.

The invention thus relates to separating materials based on supports containing hydroxyl groups, the surfaces of which are coated with covalently bonded polymers, characterized in that the polymers contain identical or different recurring units of the formula I.

The invention additionally relates to a process for the preparation of separating materials based on supports containing hydroxyl groups, the surfaces of which are coated with covalently bonded polymers, by graft polymerization in the presence of cerium(IV) ions, in which process the support particles containing hydroxyl groups are suspended and polymerized in a solution of the monomers of the formula II

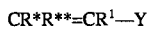   II wherein
$R^1$, R* and R** are in each case H or $CH_3$,
Y is

—CN, —CHO, —$OCOCHR^5R^6$, —$CH_2NH_2$ or —$CH_2NR^2R^3$,
X is —OH, $NR^2R^3$ or $OR^4$,
$R^2$ and $R^3$ in each case are
  an alkyl, phenyl, cycloalkyl or alkyl-cycloalkyl, phenylalkyl or alkylphenyl group having up to 10 C atoms in the alkyl group, it being possible for these groups to be monosubstituted or polysubstituted by alkoxy, cyano, amino, mono- or dialkylamino, trialkylammonium, carboxyl, sulfonyl, acetoxy or acetamino radicals, a cyclic or bicyclic radical having 5–10 C atoms wherein one or more CH or CH$_2$ groups are replaced by N or NH, N or NH and S, or N or NH and O, or a sulfone sulfide of the structure —(CH$_2$)$_n$—SO$_2$—(CH$_2$)$_n$—S(CH$_2$)$_n$OH with n=2–6 and one of the radicals R$^1$ and R$^2$ may also be H, where R$^2$ and R$^3$ are co-ordinated with one another so that either both radicals are acidic or basic or one or both of the radicals are neutral, R$^4$ is an alkyl, phenyl, cycloalkyl, alkyl-cycloalkyl, phenylalkyl or alkylphenyl group having up to 10 C atoms in the alkyl group, it being possible for these groups to be monosubstituted or polysubstituted by alkoxy, cyano, carboxyl, sulfonyl or acetoxy radicals, and R$^5$ and R$^6$ are in each case H or an alkyl group having up to 5 C atoms and/or of the formula III

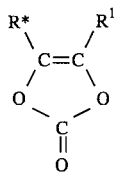   III wherein R* and R$^1$ are H or CH$_3$, and, if desired, the product thus obtained is subsequently converted into a separating material containing hydroxyl groups.

The invention also relates to the use of these separating materials for the fractionation of biopolymers.

The structure of the separating materials according to the invention is similar to that of the phase supports in EP 0,154,246, equivalent to U.S. Pat. No. 4,756,834, a divisional of Ser. No. 06/794,921, now abandoned. In contrast too the materials described there, with the compounds according to the invention, however, the polymers on the surface of the support particles have other structures and properties. The materials described in EP 0,154,246 are primarily employed as phase supports for partition chromatography in two-phase systems and themselves contain no chromatographically active groups. In contrast to this, the materials according to the invention are themselves chromatographically active and can be employed as ion exchangers and also as supports for affinity chromatography or hydrophobic chromatography.

The separating materials according to the invention are composed of support particles containing hydroxyl groups, onto which a polymeric material, starting from the monomers of the formulae II and/or III, is grafted via the α-C atoms of the hydroxyl groups.

Possible support particles are all generally known porous and non-porous chromatography supports which have primary or secondary aliphatic hydroxyl functions on the surface.

In this case, for example, hydrophilic polymers based on acrylates and methacrylates, polymers based on polyvinyl alcohol, diol-substituted silica gels, polysaccharides based on agarose, cellulose, cellulose derivatives or polymers based on dextran are preferred. However, other polymers or copolymers based on monomers such as vinyl compounds, acrylamide, (meth)acrylic acid esters or (meth)acrylonitrile in hydroxylated form can, of course, also be employed.

The polymeric material which is bonded to the support particles via the α-C atoms of the hydroxyl groups is based on the monomers of the formulae II and/or III. These monomers are (meth)acrylic acid (Y=—COOH), (meth)acrylic acid derivatives

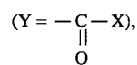

allylamines (Y=—CH$_2$NH$_2$, —CH$_2$NR$^2$R$^3$), (meth)acrylonitriles (Y=—CN), acroleins (Y=—CHO), vinylcarboxylates (Y=—OCOCHR$^5$R$^6$) or vinylene carbonates of the formula III.

All these monomers are substances which contain reversibly binding groups which may be neutral, acidic or basic and which can be polymerized by radicals in aqueous solution.

If vinylene carbonates of the formula III or vinyl carboxylates CR*R**=CR$^1$—OCOCHR$^5$R$^6$ of the formula II are employed as monomers, the product obtained is preferably subsequently converted into a separating material having hydroxyl groups. This conversion into a hydroxyl phase is achieved by a mild alkaline or acidic hydrolysis is which is known per se. For example, the reaction may be carried out using methanolic K$_2$CO$_3$ solution at room temperature, described, for example, by Y. Tezuka et al., in Macromol. Chem. 186., 685–694 (1985).

In the formulae I, II and III, R$^1$ is preferably H, i.e. the acrylic acid derivatives are preferred.

Y in formula II is preferably

—COCHR$^5$R$^6$ or —CH$_2$NH$_2$, and secondly preferably —CN or —CHO. Accordingly, Y in formula I is firstly preferably

—OH (since the —OCOCHR$^5$R$^6$ group is preferably converted into a hydroxyl phase) or —CH$_2$NH$_2$, secondly preferably —CN or —CHO.

R$^5$ and R$^6$ independently of one another are H or an alkyl group having up to 5 C atoms. Preferably, at least one of the radicals R$^5$ and R$^6$ is H. The following radicals are particularly preferred: the acetyloxy, propionyloxy, butyryloxy, valeryloxy and hexanoyloxy radicals.

In both formula I and formula II, X is —OR$^4$, —OH or —NR$^2$R$^3$, preferably —NR$^2$R$^3$.

In this connection, compounds are preferred in which X is —NR$^2$R$^3$ and one of the radicals R$^2$ and R$^3$ is H.

The radicals R$^2$ and/or R$^3$ are preferably an alkyl, cycloalkyl, phenyl, phenylalkyl or alkylphenyl group, it being possible for the alkyl, cycloalkyl and/or the phenyl group to be monosubstituted or polysubstituted, preferably monosubstituted or disubstituted, particularly preferably monosubstituted, by an alkoxy, cyano, amino or mono- or dialkylamino, trialkylammonium, carboxyl, sulfonic acid, acetoxy or acetamino radical. Cycloalkyl preferably means cyclohexyl or cyclopentyl.

The radicals $R^2$ and/or $R^3$ are preferably alkyl, alkoxyalkyl, cyanoalkyl, aminoalkyl, mono- or dialkylaminoalkyl, trialkylammoniumalkyl, carboxyalkyl or sulfonylalkyl having up to 10 C atoms, preferably up to 6 C atoms, particularly preferably up to 4 C atoms, in the alkyl group, which may be linear or branched. $R^2$ and/or $R^3$ are therefore preferably methyl, ethyl, propyl, butyl, pentyl, hexyl, methoxymethyl, ethoxymethyl, 2-methoxyethyl, 2-, 3- or 4-oxapentyl, 2-, 3-, 4- or 5-oxahexyl, 2-, 3-, 4-, 5-, or 6-oxaheptyl, isopropyl, 2-butyl, isobutyl, 2-methylbutyl, isopentyl, 2-methyl-pentyl, 3-methylpentyl, 2-oxa-3-methylbutyl, 3-oxa-4-methylbutyl, 2-methyl-3-oxapentyl, 2-methyl-3-oxahexyl, and in addition also heptyl, octyl, nonyl or decyl.

In addition, alkyl groups are also preferred which are substituted by a cyano, carboxylic acid or sulfonic acid group. $R^2$ and/or $R^3$ are therefore preferably cyanomethyl, cyanoethyl, cyanopropyl, cyanobutyl, cyanopentyl, cyanohexyl, 2-cyanopropyl, 2-cyanobutyl, carboxylmethyl, carboxylethyl, carboxylpropyl, carboxylisopropyl, carboxylbutyl, carboxylpentyl, carboxylhexyl, carboxyl-2-methylpropyl, carboxyl-2-methylbutyl, sulfonylmethyl, sulfonylethyl, sulfonylpropyl, sulfonylbutyl, sulfonylpentyl, sulfonylhexyl, sulfonyl-2-methylpropyl, sulfonyl-2-methylbutyl, sulfonyl-3-methylbutyl, sulfonyl-2-methylpentyl, sulfonyl-3-methylhexyl or sulfonyl-2-ethylpentyl.

In addition, the alkyl groups are preferably monosubstituted by an amino, mono- or dialkylamino or trialkylammonium group. The alkyl groups may in this case be identical or different and have up to 10, preferably up to 6, C atoms, particularly preferably up to 4 C atoms, and are therefore preferably dimethylaminoethyl, diethylaminoethyl, methylaminoethyl, methylaminopropyl, dimethylaminopropyl, ethylaminoethyl, propylaminoethyl, propylaminopropyl, dipropylaminoethyl, dipropylaminobutyl, diethylaminoethyl, trimethylammoniummethyl, trimethylammoniumpropyl, trimethylammoniumbutyl, triethylammoniumethyl, triethylammoniumpropyl, triethylammoniummethyl, aminoethyl, aminopropyl, aminobutyl or aminopentyl. All these alkyl and substituted alkyl groups are likewise preferred as substituents on the phenyl or cycloalkyl group.

A sulfone sulfide of the structure $-(CH_2)_n-SO_2-(CH_2)-S-(CH_2)_nOH$ having n=2, 3, 4, 5 or 6, preferably 2, 3 or 4, is also preferred for $R^2$ and/or $R^3$.

Preferably, $R^2$ and/or $R^3$ also have the meaning of a phenyl group, which is preferably monosubstituted by cyano, cyanoalkyl, amino, aminoalkyl, mono- or dialkylamino, alkyl, alkoxy, alkoxyalkyl, mono- or dialkylaminoalkyl, trialkylammonium- (sic) or trialkylammoniumalkyl, carboxyl, carboxyalkyl, sulfonic acid or sulfonylalkyl. The preferred meanings of these substitutents correspond to the preferred alkyl groups and substituted alkyl groups indicated previously. The substituent on the phenyl group is preferably located in the p-position.

p-Acetoxyphenyl, p-aminophenyl or p-acetaminophenyl are likewise preferred meanings for $R^2$ and/or $R^3$.

An alkylphenyl or phenylalkyl group is additionally preferred for $R^2$ and/or $R^3$, where the indicated preferred meanings shall also apply to the alkyl, substituted alkyl or substituted phenyl groups.

Therefore, the following substituted phenyl groups are, for example, considered as particularly preferred: 4-cyanophenyl, 4-alkylphenyl, 4-(N,N-dimethylamino)phenyl, 4-(N N-dialkylaminoethyl)phenyl, 4-ethoxyphenyl, 4-ethoxyethylphenyl, 4-trialkylammoniumphenyl, 4-carboxylphenyl, 4-sulfonylphenyl, phenylethyl, 4-(N-ethylamino)phenylpropyl or 4-cyanophenylethyl.

In addition, units of the formula I or monomers of the formula II are preferred in which $R^2$ and/or $R^3$ are a cyclic or bicyclic radical, which may be aromatic or saturated, having 5–10 C atoms, wherein one or more CH or $CH_2$ groups are replaced by N or NH, N or NH and S, or N or NH and O.

$R^2$ and/or $R^3$ are therefore preferably also a pyridine radical, imidazolyl radical, indolyl radical, and in addition preferably a pyrrole, pyrimidine, pyrazine, quinoline or isoquinoline radical.

$R^2$ and/or $R^3$ may, for example, also be a thiazole, thiadiazole, morpholine, triazine, piperazine, benzothiazole, purine, pyrazole, triazole, pyrrolidine or isoxazole radical.

In this case, the aromatic and heterocyclic radicals are particularly preferred.

The radicals $R^2$ and $R^3$ must, in order to produce suitable exchangers, be co-ordinated with one another so that either both radicals contain an acidic or basic group or, however, one of the radicals is neutral. It causes no difficulty to the person skilled in the art to allocate the groups accordingly and therefore to put together suitable radicals for $R^2$ and $R^3$, depending on the function and object of the desired ion exchanger.

Preferably, one of the two radicals $R^2$ and $R^3$ is a neutral radical.

$R^4$ is preferably alkyl, alkoxyalkyl, cyanoalkyl, carboxyalkyl or sulfonylalkyl having up to 10 C atoms, preferably having up to 6 C atoms, particularly preferably having up to 4 C atoms in the alkyl group, which may be linear or branched. $R^4$ is therefore preferably methyl, ethyl, propyl, butyl, pentyl, hexyl, methoxymethyl, ethoxymethyl, 2-methoxyethyl, 2-, 3- or 4-oxapentyl, isopropyl, 2-butyl, isobutyl, 2-methylbutyl, isopentyl, 2-methylpentyl, 3-methylpentyl, 2-oxa-3-methylbutyl, 3-oxa- 4-methylbutyl, 2-methyl-3-oxapentyl or 2-methyl-3-oxahexyl.

In addition, alkyl groups which are substituted by a cyano, carboxyl or sulfonyl group are also preferred. $R^4$ is therefore preferably cyanomethyl, cyanoethyl, cyanopropyl, cyanobutyl, cyanopentyl, cyanohexyl, 2-cyanopropyl, 2-cyanobutyl, carboxylmethyl, carboxylethyl, carboxylpropyl, carboxylisopropyl, carboxylbutyl, carboxylpentyl, carboxylhexyl, carboxyl-2-methylpropyl, carboxyl-2-methylbutyl, sulfonylmethyl, sulfonylethyl, sulfonylpropyl, sulfonylbutyl, sulfonylpentyl, sulfonylhexyl, sulfonyl-2-methylpropyl, sulfonyl-2-methylbutyl, sulfonyl-3-methylbutyl, sulfonyl-2-methylpentyl, sulfonyl- 3-methylhexyl or sulfonyl-2-ethylpentyl.

All these alkyl and substituted alkyl groups are likewise preferred as substituents on the phenyl group.

Preferably $R^4$ also has the meaning of a phenyl or cycloalkyl group, which is preferably monosubstituted by cyano, cyanoalkyl, alkyl, alkoxy, alkoxyalkyl, carboxyl, carboxyalkyl, sulfonyl or sulfonylalkyl. The preferred meanings of these substituents correspond to the previously mentioned alkyl groups and substituted alkyl groups. The substituent on the phenyl or cyclohexyl, group is preferably located in the p-position.

$R^*$ and $R^{**}$ in the monomers of the formula II are preferably H, and therefore R' and R" in formula I preferably also have the meaning of hydrogen.

Separating materials are also prefer-red in which Y=—OH in formula I and one of the radicals R' and R" is likewise —OH. A vinylene carbonate of the formula III must then be employed as a monomer, and the product formed in the polymerization must then be converted into a hydroxyl phase.

R* and $R^1$ in formula III are preferably H. * in formula I is the number of recurring units and is 2–100, preferably 5–60, chain lengths of 10–30 being particularly preferred.

In order to prepare the materials according to the invention the support particles containing hydroxyl groups are suspended in a solution of monomers, preferably in an aqueous solution. The grafting of the polymeric material is effected in the course of a customary redox polymerization with exclusion of oxygen. Cerium(IV) ions are employed as the polymerization catalyst, since this catalyst forms radical sites on the surface of the support particles, from which the graft polymerization of the monomers is started. The length and number of the resultant chains can be controlled by the person skilled in the art by adjusting the cerium(IV) salt and the monomer concentration as desired.

Reference is made to E. Mino and S. Kaizerman in J. of Polymer Science, Vol. XXXI, No. 122 (1958), 242–243 respecting details of this process, which is known per se.

In order to prepare separating materials which have a copolymer bonded to the surface, the corresponding, different monomers of the formulae II and/or III are simply suspended in the solution.

In this case, in order to obtain exchangers according to the invention, the monomers of the formula I for copolymerization must be selected so that both monomers either contain basic or acidic groups or one monomer is neutral.

Otherwise, the general rules and conditions which the person skilled in the art can infer from the prior art apply to the selection of monomers which are suitable for copolymerization.

The large number of monomers of the formulae II and/or III which can be employed leads to a large range of weakly basic, weakly acidic to strongly acidic or basic exchangers and supports for affinity chromatography or hydrophobic chromatography.

All of the materials according to the invention are particularly suitable for the fractionation of biopolymers, such as, for example, peptides, proteins and nucleic acids.

In addition, all these materials may be employed for the separation and purification of viruses, cell organelles, procaryotic or eucaryotic cells as well as protein complexes.

With the large number of monomers, the optimum separating material can be prepared for each separation problem, so that affinity effects can be combined with ionic bonds.

The separating materials which, in formula I, contain

—$CH_2NH_2$ or —$CH_2NR^2R^3$ are particularly suitable as ion-exchange materials. Materials having a —CHO group in formula I are particularly suitable for affinity chromatography.

It has been shown that the materials according to the invention can be prepared with very much higher binding capacity than the customary ion exchangers or the customary supports for affinity chromatography.

In addition, desoxyribonucleic acids, for example, are completely reversibly bound to these materials and restriction fragments are separated according to their size.

A great advantage of these new exchangers is that, owing to the mobility of the grafted chain polymers, each charged macromolecule finds corresponding counter groups at the optimum distance from the matrix.

In addition, no structural alterations of the bonded macromolecule occur, since the exchanger with its, for example, basic exchanger groups, adapts to the arrangement of the acidic groups of a macromolecule and not the reverse.

The materials according to the invention therefore make available a large number of the most diverse separating materials which are new with respect to structure and function, for the separation of macromolecules, in particular biopolymers.

The following examples serve to illustrate the invention further.

In the examples, the following supports containing hydroxyl groups were employed as starting materials:

Fractogel® TSK HW 65 (S)-5S(S)- porous mixed polymer based on vinyl, 1 meq of OH/g. (E. Merck)

LiChrospher® diol:diol-substituted silica gel (E. Merck).

Without further elaboration, it is believed that one skilled in the art can, using the preceding description; utilize the present invention to its fullest extent. The following preferred specific embodiments aree, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application German P 38 11 042.3, filed Mar. 31, 1988, are hereby incorporated by reference.

EXAMPLES

Example 1

Preparation of a weakly acidic cation exchanger:

50 ml of Fractogel® HW 65(s) which have been filtered with suction are suspended in a solution of 19 g of acrylic acid in 150 ml of water and rinsed with argon, 15 ml of a 0.4M solution of ammonium cerium(IV) nitrate in 0.1M $HNO_3$ are added at 25° C. with exclusion of oxygen and the mixture is stirred for 3 hours at the same temperature. The reaction product is filtered with suction, and washed with water, then with 500 ml of sodium sulfite in 10% acetic acid, subsequently with 500 ml of 0.2M NaOAc solution and finally with water again.

The product contains 0.8 mVal of acidic groups per ml and binds 99 mg of lysozyme per ml of packed gel from 20 mM Na phosphate buffer, pH 7.0, which is completely released again in 0.5 mol/l of NaCl in phosphate.

Example 2

Preparation of a weakly basic ion exchanger:

100 ml of sedimented LiChrosphel® diol (1,000 Å pore width, 10 μm particle size) are thoroughly washed with distilled water, 0.2M NaOAc solution and again with water and suspended in a solution of 104 g of N,N-di-methylaminoethyl-acrylamide (A) in 700 ml of water (adjusted to pH 5.0 with $HNO_3$) in a 1,000 ml reaction vessel having a thermostat mantle, the temperature is adjusted to 25° C. and the atmospheric oxygen is displaced from the suspension by Ar. 100 ml of a 0.4M cerium ammonium nitrate solution in 1M $HNO_3$ are added with exclusion of air, and the suspension is stirred for 3 hours at about 200 rpm using a blade stirrer. The reaction is stopped by addition of air, and the reaction product is filtered off, washed with 500 ml of water, rinsed with 500 ml of 0.2M $Na_2SO_3$ in 10% AcOH, then with 500 ml of 0.2M NaOAc and washed neutral with water.

N content: 1.1%; binding capacity for bovine serum albumin: 60 mg/ml of gel (0.05M tris buffer, pH 8.3).

Example 3

Preparation of a basic exchanger:
Graft polymerization of LiChrospher® diol (1,000 Å pore width, 10 μm particle size)

The preparation is carried out analogously to Example 2; however, 123 g of N,N-diethylaminoethyl-acrylamide (B) are used instead of (A).

N content: 0.5%; binding capacity for bovine serum albumin: 45 mg/ml (0.05M tris buffer, pH 8.3).

Example 4

Preparation of a strongly basic anion exchanger:
Starting material: LiChrospher® diol (1,000 Å pore width, 10 μm particle size)

The preparation is carried out analogously to Example 2; 113 g of trimethylammoniummethyl-acrylamide (C) are employed instead of (A).

N content: 0.5%; binding capacity for bovine serum albumin: 76.3 mg/ml of gel (0.05M tris buffer, pH 8.3).

Example 5

Preparation of a strongly acidic exchanger:
Starting material: LiChrospher® diol (1,000 Å pore width, 10 μm particle size)

The preparation is carried out analogously to Example 2; 150 g of 2-acrylamido-2-methylpropanesulfonic acid (D) are employed instead of (A).

N: 0.2%; S: 0.2%; binding capacity for lysozyme: 36 mg/ml of gel (20 mM $PO_4$, pH 7.0)

Example 6

Preparation of a weakly basic exchanger
Starting material: Fractogel® TSK HW 55(S)

The preparation is carried out analogously to Example 2; 100 ml of Fractogel® and 60 g of N,N-dimethyl-aminoethyl-acrylamide (A) are employed instead of LiChrospher® diol.

N: 5.31%; binding capacity for bovine serum albumin: 57 mg/ml of gel (0.05M tris, pH 8.3).

Example 7

Preparation of a basic exchanger:
Starting material: Fractogel® TSK HW 65 (M)

The preparation is carried out analogously to Example 2; 123 g of N,N-diethylaminoethyl-acrylamide are employed instead of (A).

N: 2.5%; binding capacity for bovine serum albumin: 79 mg/ml of gel (0.05M tris buffer, pH 8.3).

Example 8

Preparation of a strongly basic anion exchanger:
Starting material: Fractogel® TSK HW 65(M) 100 ml 113 g of trimethylammoniumethylacrylamide.

The preparation is carried out analogously to Example 2;

N: 3.80%; binding capacity for bovine serum albumin: 154 mg/ml of gel (0.05M tris buffer, pH 8.3).

Example 9

Analogously to Example 2, a strongly acidic ion exchanger is prepared from 100 ml of Fractogel® TSK HW 65(S) and 150 g of 2-acrylamido-2-methylpropanesulfonic acid.

N: 0.5%, S: 0.7%; binding capacity for lysozyme: 51 mg/ml of gel (20 ml $PO_4$, pH 7.0).

In the previous examples tris is tris (hydroxymethyl)aminomethane. HCl and $PO_4$ is sodium phosphate buffer.

Example 10

Analogously to Example 1, a cyano-Fractogel, suitable for reversed-phase chromatography, is prepared by reaction of 100 ml of Fractogel® TSK HW 65(S) and 60 g of acrylonitrile.

Content of N: 8.9%

Example 11

Analogously to Example 2, an aldehyde phase for the chromatography of primary amines or the immobilization of primary amines and proteins for affinity chromatography is prepared from 100 ml of LiChrospher® diol (1,000 Å pore width and 10 μm particle size), 39.2 g of acrolein and 50 g of N-methylacrylamide by mixed graft polymerization.

Example 12

Analogously to Example 1, an amino phase is prepared from 100 ml of Fractogel® TSK HW 65(S) and 160 g of allylamine.

Content of N: 0.55%.

Example 13

Analogously to Example 2, an acetoxy phase, when can be converted into a hydroxyl phase by treatment with methanolic $K_2CO_3$ solution at room temperature (compare Y. Tezuka et al., Macromol. Chem. 186, 685–694 (1985)), is prepared from 100 ml of sedimented LiChrospher® diol (1,000 Å pore width and 10μm particle size) and 36 g of vinyl acetate.

Example 14

Analogously to Example 2, a phase which can easily be converted into the desired hydroxyl phase by mild alkaline or acidic hydrolysis, is prepared from 100 ml of sedimented LiChrospher® diol (1,000 Å pore width, 10 μm particle size) and 140 g of vinylene carbonate.

The following examples relate to use examples.

Example A

Fractionation of DNA restriction fragments

The basic exchanger prepared according to Example 2 is packed into a Superformance® column (50×10 mm, manufacturer: E. Merck) in 20 mM tris-HCl, pH 6.5, equilibrated at 2 ml/min using the same buffer, and loaded with 3 absorption units (260 nm) of restriction fragments from pDS1 plasmid with the lengths 11, 18, 31, 45, 80, 85, 87, 222, 262, 267, 270, 314, 434, 458, 587 and 657 base pairs. Subsequent elution using an NaCl gradient (0–1M NaCl) in the equilibration buffer at 1 ml/min resulted in a very good separation of the individual restriction fragments.

Example B

Fractionation of goat serum

The material prepared in Example 8 is packed into a Superformance® column (50×10 mm), equilibrated using 20 mM of tris-HCl, pH 8.3, loaded with 50 µl of serum in 250 µl of buffer and eluted with a linear gradient of 0–500 mM $Na_2SO_4$ in the same buffer. A noteworthy separation of the globulins of the albumin is obtained.

Example C

Separation of β-lactoglobulin A and B.

The material prepared according to Example 3 is packed into a Superformance® column (50×10 mm), equilibrated using 20 mM of Na-$PO_4$, pH 6.8, loaded with 0.6 mg of a commercial mixture of β-lactoglobulin A and B in 100 µl of buffer and eluted with a 50 ml gradient of 0–500 mM $Na_2SO_4$ (linear) in the buffer indicated. A very good separation of β-lactoglobulin A and β-lactoglobulin B is obtained.

Example D

Fractionation of mouse ascites fluid using monoclonal antibody.

The material prepared according to Example 3 is packed into a Superformance® column (50×10 mm), equilibrated using 20 mM tris-HCl, pH 8.3, loaded with 1.5 ml of ascites fluid in 4.5 ml of buffer, and eluted with a gradient (100 ml) of 0–250 mM $Na_2SO_4$ in the starting buffer.

Example E

Fractionation of immunoglobulin (IgG) from human serum

1. The material prepared in Example 5 is packed into a Superformance® column (50×10 mm), equilibrated using 10 mM NaOAc/HOAc, pH 5.0, loaded with 3.5 mg of IgG and eluted with an NaCl gradient (100 ml, 0–1M) in the same buffer. A relatively good fractionation is obtained.

2. Fractionation analogous to 1, using the material prepared in Example 9.

3. Fractionation of IgG analogous to E 1, on conventional SP-Fractogel 650(s): the elution profile obtained in this case hardly shows any fractionation.

It can be concluded from these experiments that with the use of a conventional material a poorer separation takes place than with the use of exchangers according to the invention.

Example F

Fractionation of mouse ascites fluid using monoclonal antibody.

The strongly acidic exchanger prepared according to Example 5 is packed into a Superformance® column (50× mm), equilibrated using 10 mM NaOAc/AcOH, pH 5.0, loaded with 100 µl of ascites and eluted in a gradient (50 ml of 0 to 500 mM NaCl). A good separation of the immunoglobulins is obtained using the monoclonal antibody.

From the above examples, it is evident that very good separation results can be obtained using the ion exchangers according to the invention and these materials are advantageously suitable for the separation of biopolymers.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A separating material comprising a primary or secondary aliphatic hydroxyl group-containing support coated with at least one covalently bonded polymer, wherein (1) the covalently bonded polymers are bonded to the support by graft polymerization via the α-carbon atoms of the hydroxyl groups, and (2) the polymer contains identical or different recurring units of the formula I

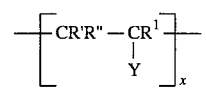

wherein
   $R^1$ is H or $CH_3$;
   Y is

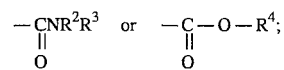

R' and R'' are each independently H or $CH_3$,
   $R^2$ and $R^3$ are each independently
   (a) $C_{1-10}$-alkyl, phenyl, phenyl-$C_{1-10}$-alkyl, cycloalkyl, $C_{1-10}$-alkyl-cycloalkyl or $C_{1-10}$-alkylphenyl,
   (b) one of the above groups in (a) monosubstituted or polysubstituted by each of amino, mono- or dialkylamino, trialkylammonium, carboxyl, or sulfonyl,
   (c) a cyclic or bicyclic radical having 5–10 C atoms, wherein one or more CH or $CH_2$ groups is replaced by (i) N or NH, (ii) N or NH and S, or (iii) N or NH and O, or
   (d) one of $R^2$ or $R^3$ is H;

and wherein $R^2$ and $R^3$ are coordinated with one another so that either both radicals are acidic or basic, or one of the radicals is neutral and one is acidic or basic,
   x is 2 to 100,
   and $R^4$ is $C_{1-10}$-alkyl, phenyl, phenyl-$C_{1-10}$-alkyl, cycloalkyl or $C_{1-10}$-alkyl-cycloalkyl, or $C_{1-10}$-cyclophenyl, each monosubstituted or polysubstituted by carboxyl or sulfonyl.

2. A separating material according to claim 1, wherein R', R'' and $R^2$ are H, Y is

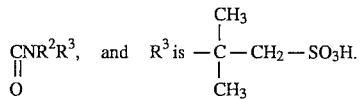

3. A separating material according to claim 1, wherein $R^2$ and $R^3$ are each independently
   (a) $C_{1-10}$-alkyl, phenyl, phenyl-$C_{1-10}$-alkyl, cycloalkyl, $C_{1-10}$-alkyl-cycloalkyl or $C_{1-10}$-alkylphenyl,
   (b) one of the above groups in (a) monosubstituted or polysubstituted by each of amino, mono- or dialkylamino, trialkylammonium, carboxyl, or sulfonyl, or
(c) one of $R^2$ or $R^3$ is H.

4. A separating material according to claim 1, wherein $R^2$ and $R^3$ are each independently $C_{1-10}$-alkyl.

5. A separating material according to claim 1, wherein Y is $$-\underset{\underset{O}{\|}}{C}H_2NR^2R^3.$$

6. A separating material according to claim 5, wherein $R^2$ and $R^3$ are each independently (a) $C_{1-10}$-alkyl, phenyl, phenyl-$C_{1-10}$-alkyl, cycloalkyl, $C_{1-10}$-alkyl-cycloalkyl or $C_{1-10}$-alkylphenyl, (b) one of the above groups in (a) monosubstituted or polysubstituted by each of amino, mono- or dialkylamino, trialkylammonium, carboxyl, or sulfonyl, or (c) one of $R^2$ or $R^3$ is H.

7. A separating material according to claim 5, wherein $R^2$ and $R^3$ are each independently $C_{1-10}$-alkyl.

* * * * *